Feb. 27, 1968  J. C. STANTON  3,371,272
ELECTROMAGNETIC SENSING PROBE STRUCTURE AND SYSTEM FOR GAGING
PROXIMITY OF METALS AND THE LIKE UTILIZING A LINEAR
VARIABLE DIFFERENTIAL TRANSFORMER
Filed Sept. 9, 1964  3 Sheets-Sheet 1

INVENTOR
JOSHUA CLARKE STANTON
BY
Mason, Fenwick & Lawrence
ATTORNEYS

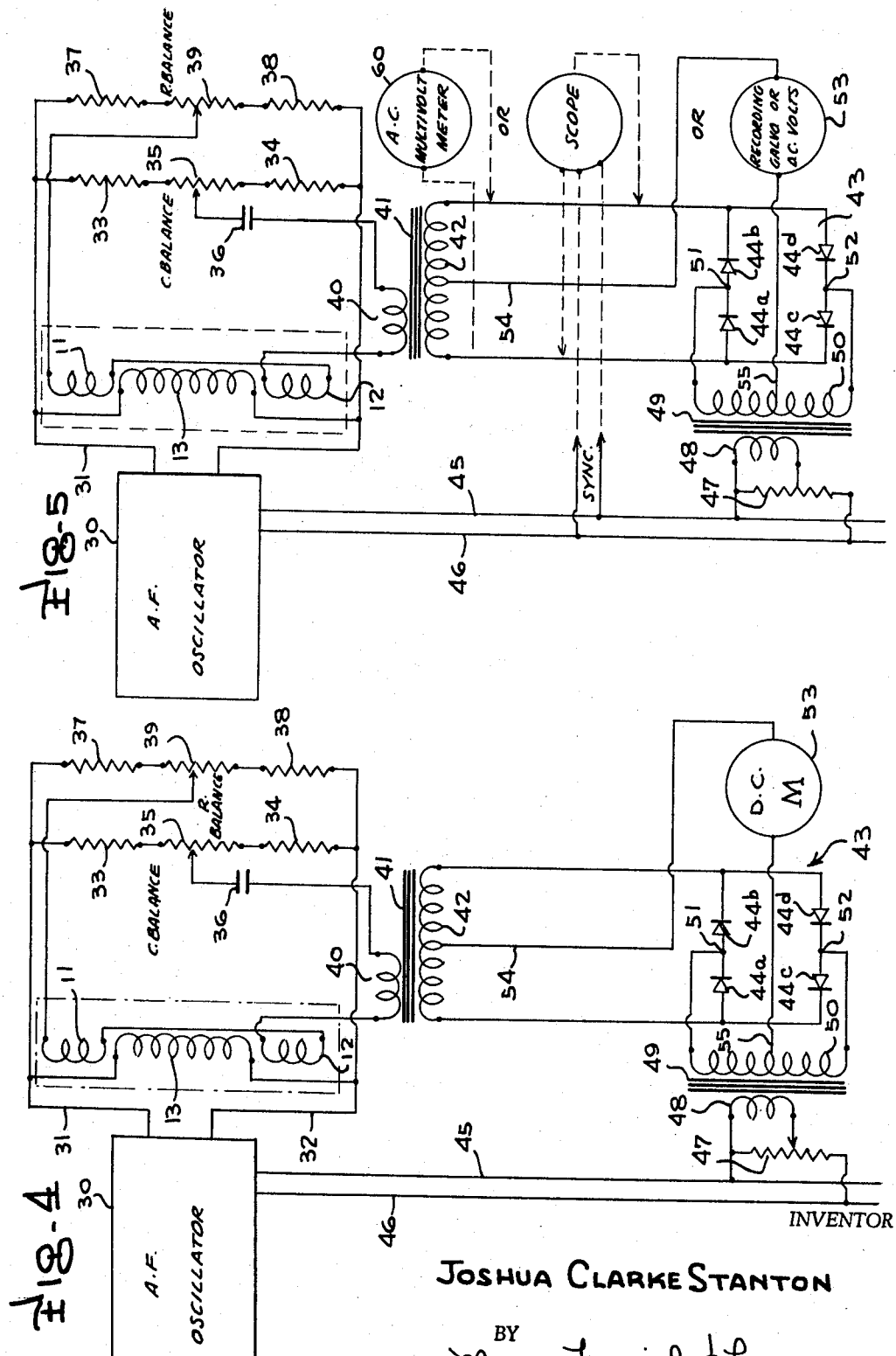

INVENTOR
JOSHUA CLARKE STANTON
BY Mason, Fenwick & Lawrence
ATTORNEYS

United States Patent Office 3,371,272
Patented Feb. 27, 1968

3,371,272
ELECTROMAGNETIC SENSING PROBE STRUCTURE AND SYSTEM FOR GAGING PROXIMITY OF METALS AND THE LIKE UTILIZING A LINEAR VARIABLE DIFFERENTIAL TRANSFORMER
Joshua Clarke Stanton, 359 Buena Vista Ave., Arnold, Md. 21012
Filed Sept. 9, 1964, Ser. No. 395,186
8 Claims. (Cl. 324—34)

ABSTRACT OF THE DISCLOSURE

An electromagnetic sensing probe structure and system for gaging the proximity of electrically conductive materials and the like, wherein the sensing probe is in a generally cylindrical configuration including a centrally disposed, axially elongated inner magnetic core member having three separate coils including an exciter coil and a pair of secondary coils arranged in axially spaced relation along a common axis on the inner core member. The probe also includes an outer, cup-shaped core member of magnetic material formed of an annular cylindrical outer wall concentrically surrounding and radially spaced from the inner core member and the coils thereon and a disk-like end wall integral with the cylindrical outer wall closing one end of the probe, the open end of the cup-shaped core defining the sensing end of the probe. A non-magnetic shield of generally cup-shaped configuration concentric with the axis of the probe encloses the cup-shaped core. Electric connections are made to the coils for applying an alternating current signal of selected frequency to the exciter coil and for coupling from the secondary coils to external apparatus voltage conditions related to the distance between the target material and the sensing end of the probe, the outer cup-shaped core being configurated and related to the inner core to produce a concentrated projected field adjacent the sensing end of the probe shaped to provide a linear change in output voltage from the secondary coils with change in distance of the target surface from a selected distance spaced outwardly from the sensing end.

The present invention relates in general to detector devices for sensing or measuring location or dimensional properties or identifying characteristics of electrically conductive materials spaced therefrom, and more particularly to a sensing probe which exhibits projected electrical field configuration effects producing output signals which vary in identifiable relation to variations in the proximity or composition of electrically conductive materials.

Heretofore, various sensing devices have been developed for gaging the location of surfaces of a test material relative thereto for various purposes such as measuring thickness, monitoring the position of a work material or variations therein, quality control as by detecting variations in the position of a surface from the sensing element, and like applications. Such devices, when designed with high accuracy characteristics have usually required physical contact of some component of the sensing element with the proximate surface of the material of interest.

An object of the present invention is the provision of a novel system for making non-contacting static and dynamic measurements of the location of surfaces of an electrical conductive body.

Another object of the present invention is the provision of an electromagnetic sensing probe having unique projected field properties whereby a novel relationship between output voltage from the probe and distance to the proximate surface of an electrically conductive body exists permitting accurate determination of location or composition of the body.

Another object of the present invention is the provision of a sensing probe for gaging the proximity of an electrical conductive surface relative thereto wherein an approximate 180° phase shift occurs in the output generated by the sensing element at a determinable distance therefrom for identified materials, whereby the distance of the proximate surface of the test material to the sensing element can be accurately gaged.

Another object of the present invention is the provision of a novel system of non-contacting measurement of the thickness of materials and coatings of selected character.

Other objects, advantages and capabilities of the present invention will become apparent from the following detailed description, taken in conjunction with the accompanying drawings illustrating a preferred embodiment of the invention.

In the drawings:

FIGURE 4 is a schematic diagram of the probe and exemplary circuitry for a proximity measuring application;

FIGURE 5 is a schematic diagram of a circuit for effecting metal identification with the probe of the present invention;

The present invention depends for its operation on a novel probe type of carrier current operated electromagnetic sensing element designed to produce a distinctive electric field by virtue of a unique arrangement of coils and magnetic circuitry such that, for electrically conductive target materials, an approximate 180° phase shift in output voltage from the probe occurs at determinable distances from the probe. In its simplest form the probe consists of three inductively coupled windings, two of which are coupled in opposition and may be used either as primary or exciting windings, or as output signal windings. The remaining winding, of course, is used for the function that is the alternate to the function selected for the two windings coupled in opposition. A magnetic structure is provided to confine the fields to some degree and to improve electromagnetic flux linkage between the windings. If the single winding is excited with an alternating current there should be essentially zero voltage across the output terminal of the inductively coupled pair of signal windings, providing the sensing element has been constructed with due regard for electrical and magnetic symmetry. The magnetic core structure of the sensing element is closed at one end and open at the other. Through careful shaping and proportioning of the magnetic pole faces at the open end, it is possible to obtain a projected field effect wherein there is a well defined point of almost zero output voltage and a coincident approximate 180° phase shift in output signal for materials having reasonably good electrical conductivity spaced from the open end, by which the proximity of surfaces of the materials may be gaged.

Figure 1:
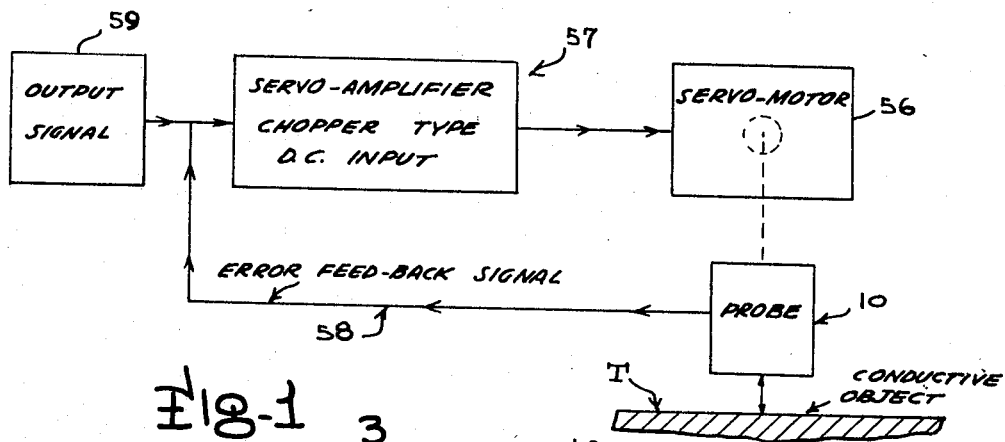
FIGURE 1 is a block diagram of the probe and exemplary exciting and detecting means embodying the present invention, illustrating the same in a proximity measuring application.
Figure 2:
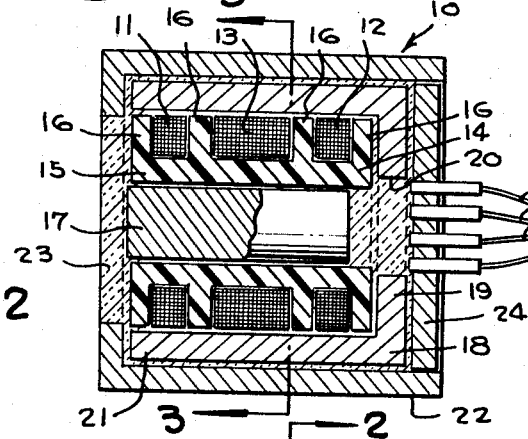
FIGURE 2 is a vertical section view of the probe taken along the line 2—2 of FIGURE 3.
Figure 3:
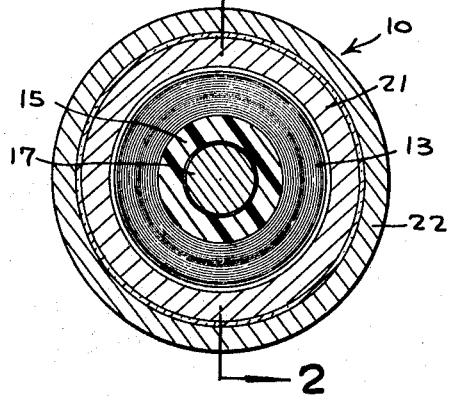
FIGURE 3 is a horizontal section view of the probe, taken along the line 3—3 of FIGURE 2.

A specific example of the sensing probe is illustrated in FIGURES 1 to 3 of the drawings, the probe being indicated generally by the reference character 10, the two inductively coupled output signal windings being indicated by reference characters 11 and 12, and the single exciting winding being indicated by the reference character 13. The three coils 11, 13 and 12 are arranged along a common axis on a non-metallic coil form 14 including, for example, an axial tubular body portion 15 having an inner diameter of 0.375 inch and an outer diameter of 0.50 inch and a plurality of radially extending annular spacer ribs or projections 16 having an outer diameter of 0.75 inch and a thickness of $\frac{1}{32}$ inch, the spacers for the center coil 13 being spaced apart .3275 inch and the spacers for the outer coils 11 and 12 being spaced apart .15575 inch. An internal core of ferro-magnetic material indicated by reference character 17 is disposed within the hollow bore of the coil form 14 and is located along the probe axis. The length, diameter and axial position of the core are functions of requirements described in the following paragraphs.

Surrounding the coils 11–13 and their coil form 14 is an integral external core 18 of ferro-magnetic material, which is in the shape of a cylinder closed at one end, as by an annular wall 19 having a central axis hole 20 therein to permit passage of coil lead wires therethrough. The cylindrical side 21 of the core and the end 19 are encased in a non-magnetic metal shell 22, such, for example, as brass.

This external core 18, in one specific example, may have an outer diameter of 1 inch and a wall thickness of 0.125 inch, and an axial length of 1 inch. In assembled form, the probe is in the shape of a cylinder, with one sensitive, or "active" end, indicated by the reference character 23, and one inactive end 24 from which the lead wires 25 are brought. The active end 23 is the face from which the hereinafter described measurement functions are performed. The inductively coupled pair of output signal windings 11, 12 have the same number of turns of wire and are wound in phase opposition so that their magnetic fields are in opposition to each other. This can be accomplished either by winding in opposite directions or by a suitable arrangement of lead wire connections. For example, the coils 11 and 12 may each be formed of 1000 turns of number 38 enameled copper wire. The exciting winding 13 is wound in one direction in its entirety with a substantially greater number of turns than coil 11. In the specific example, the coil 13 may contain 1500 turns of number 38 enameled copper wire, although the single coil may have as many as twice the number of turns as each of the coils 11, 12. The internal and external core members 17 and 18 are preferably formed, in the particular example, by placing the coils 11–13 and coil form 14 within the shell 22 and filling the remaining cavities with iron filled hardenable cement such as epoxy resin. Thereby, one assembly process completely forms the cores and bonds all the components into one unit. Also, the inner and outer cores 17 and 18 may, if desired, be formed of iron filled, hardenable cement, such for example as Devcon B and 80% iron putty, or may be castings of iron filled epoxy resin, or may be machined from a suitable precast matrix of finely divided iron particles.

If an alternating current excitation signal is impressed on the single coil 13, an alternating voltage will appear across the terminals of the coils 11 and 12 provided that the proper connection is made between coils 11 and 12. As an electrically conductive surface approaches the active face of the probe of the generic form shown in FIGURES 1 to 3, the output voltage is reduced, and diminishes to essentially zero when the target surface reaches a specific critical distance from the face of the probe. During this approach, the phase angle between the applied voltage and the induced voltage remains constant. As the target surface reaches the critical distance from the active face and continues to approach the probe, the induced voltage progressively increases until the probe face contacts the conductive surface. At distances between probe and target which are less than the distance at which the induced voltage reaches zero, or a minimum value, the phase angle between the applied voltage and the induced voltage is constant and differs by approximately 180° from the phase angle obtained at greater than the critical distance. As a consequence there exists a specific distance between the active face of the probe and the conductive surface of interest, at which the output voltage of the probe is reduced to zero and, simultaneously, the phase of the output signal is changed by approximately 180°. This provides a unique and important feature enabling the probe to be used as the controlling element in various actuating and positioning functions, as well as in performing measurements. By careful shaping and proportioning of the various components, and by proper positioning of the core, this phase shift distance can be altered from negative values (within the length of the probe) to maximum distances which are a function of excitation frequency, material being sensed, and configuration of the probe.

Of course, the excitation voltage can be impressed across coils 11 and 12, and the induced voltage can be measured in coil 13, without changing any of the essentials described herein. In its preferred form the probe is self-shielding and is not affected by metallic or conductive material in proximity to its inactive surfaces.

Figure 8:
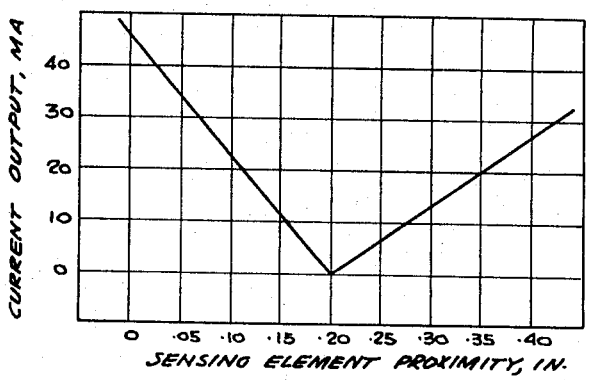
FIGURE 8 is a plot of current output in milliamperes against proximity in inches for a probe as shown in FIGURE 1.

The nature of the output signal with distance variation for a specific practical example of the novel sensing probe is illustrated in FIGURE 8 which is a plot of output current in milliamperes against probe distance from a target in inches. In this example the target material was structural steel and the exciting signal applied to the single exciting winding was a 10 kilocycle carrier signal having an amplitude of 5 volts. It will be noted that the output current dipped to zero when the active end of the probe was located .20 inch from the proximate surface of the target material and that the output current exhibited a substantially linear rise with distance as the spacing to the target decreased or increased from this node point. The phase of the output signal also underwent an approximate 180° phase shift at this node point.

The almost linear voltage-distance characteristic of the response, and the null-point-phase-shift feature makes this sensing element useful for a wide range of measuring, positioning, and control functions. The sensing element, which can be of relatively small dimensions, has no moving parts, does not require any contact with the surface of interest, and is totally contained within a magnetic and electrostatic shield. It provides a well-defined point of minimum output signal and coincident approximate 180° phase shift in output signal, which makes is applicable for a wide range of processes and functions which require a sharply defined reference gage length. Used with an amplitude and phase discriminating circuit it can control positioning devices or regulate displacement of machine elements. It also offers unique advantages for incorporation into various vibration, pressure, and other types of transducers where the linear response and phase change characteristics can be used to advantage. Among its inherent advantages are its low impedance, reducing sensitivity to high frequency interference; an ability to operate over a frequency range running from the low audio to very high radio frequencies; and the ability to work with standard carrier-amplifier systems and standard outputs such as voltmeters, ammeters, cathode ray oscilloscopes and recording oscillographs. With such standard equiment, mechanical displacements of 0.000001 inch and less have been sensed with reliable repeatability.

The sensing probe proximity response can be further used as a frequency control element in an FM oscillator circuit, allowing digital readout of sensing element output, reduced signal distortion due to outside interference or self-noise. By use of this FM circuitry, the sensing probe response to a diaphragm vibration will act as a frequency modulated microphone or for any other response where FM or digital output is required or preferred.

The sensing probe of the present invention is especially suitable for non-contacting monitoring of the location of a moving body of electrically conductive material relative to the active end of the probe or to produce a visible indication of variations in the relative location of the monitored surface. For example, conventional recorders, meters or indicators may be activated in response to the phase and/or amplitude of output signals derived from the probe to indicate deviations of the surface of electrically conductive sheet material from a true plane during manufacture thereof as the material is fed continuously through a monitoring station or to indicate periodic variations in the proximity of the near surface of a high speed rotating shaft as when the shaft surface does not remain perfectly concentric with its axis of rotation.

Exemplary circuitry for producing a D.C. output signal from the probe having polarity or direction (phase) and amplitude which are a function of the distance of the target surface from the probe, is illustrated in FIGURE 4. In the circuit of FIGURE 4, the exciting winding 13 of the probe is supplied with an alternating current signal from a suitable A.C. generator or audio oscillator 30 by output leads 31, 32. A balancing circuit comprising resistors 33 and 34, potentiometer 35 and capacitor 36 connected to the potentiometer contact wiper is provided for balancing the probe capacitive reactance, while resistors 37 and 38 and potentiometer 39 form a circuit to balance the probe resistive reactance. The secondary coils 11, 12 of the probe are connected in phase opposition for a minimum signal output from the probe. The secondary signal from the probe is derived from the unbalancing effect which a conducting target has on the two secondary windings 11, 12. Since they are connected in phase opposition, at some geometrical relationship of the probe cores and the target, the signal in each secondary coil will be equal with zero output. Any change in the position of the target will cause an unbalance between the secondary coils, with a resultant output signal. The output signal is applied across the primary winding 40 of the coupling transformer 41, which performs the dual functions of amplifying and impedance matching. The secondary winding 42 of the coupling transformer 41 applies the amplified output signal across a four element ring demodulator 43 having diodes 44a, b, c and d connected as shown. A reference signal derived from the audio oscillator 30 through leads 45, 46 and adjusted by potentiometer 47 is applied to the primary windings 48 of transformer 49, the secondary windings 50 of which are connected to the points 51, 52 of the ring demodulator 43 to provide a reference signal for amplitude and phase comparison. A suitable readout device, for example a zero-center direct current meter 53, such as a galvanometer, is connected by leads 54, 55 to the center taps of transformer secondaries 42 and 50. With this configuration, the resultant demodulated signal as seen at the readout 53 is a function of both the amplitude of the probe secondary signal and the phase angle between the primary and secondary signals. Thus, the amplitude of the direct current component of the signal seen at readout 53 responds directly to the distance between the target and the probe.

A specific application of the sensing probe embodying the present invention in a positioning or gaging system employing a servo-actuated device is illustrated in block diagram form in FIGURE 1, wherein the probe and the circuitry for producing the output signal which varies in polarity (phase) and amplitude as a function of target surface spacing from the probe are of the type illustrated in FIGURE 4. In this positioning system application, the sensing probe 10 may be mounted on a carriage (not shown) and maintained at a fixed distance from the proximate surface of the electrically conductive target material, herein indicated by the reference character T, the carriage being positioned relative to the target material by a servo-motor 56 controlled by a servo-amplifier 57, for example of the chopper type regulated by a D.C. input, both of which are well known to persons skilled in the art. The servo-motor 56 is mechanically linked to the probe 10 as indicated by broken lines in FIGURE 1, as by the carriage herein above mentioned, and a suitable conventional error feedback signal connection, indicated at 58, is provided for the servo-amplifier to indicate when the probe attains the proper position signalled by the servo-amplifier. The servo-amplifier is also responsive to D.C. input voltages derived from probe output circuitry 59, for example of the type illustrated in FIGURE 4, to activate servo-motor 56 and drive the probe 10 in a corrective manner so as to maintain a precise and preselected distance between the active end of the probe and the proximate surface of the target material. With proper selection of circuit components, this distance can be maintained within close and predictable limits in the face of regular or irregular movement of the target surface normal to the probe axis. Movement of the target surface in such a manner that the distance between the target surface and the probe remains constant does not cause any alteration of the output signal. For instance, a stationary probe in proximity to a shaft will produce no difference in the output signal with the shaft rotating or stationary, provided the shaft surface is perfectly eccentric with the axis of rotation. By selecting the position of the mechanical linkage, for example the carriage, as a reference point, the travel of the mechanical linkage as the servo-system maintains the sensing probe at a position about zero voltage and phase may be translated into measurement or control information. By installing a duplicate system arrangement in opposition to the first system and monitoring the spacing between this sensing probe and the opposite surface of the target material, the material being passed between the two sensing probes, thickness measurements of the target material may be obtained. Thickness measurements may also be obtained by passing the target material over a stationary platform or supporting surface having a known initial distance from the probe 10 of a signal positioning system of the type shown in FIGURE 1, and monitoring variations in the probe position from movements of the mechanical linkage to produce a readout of material thickness variations.

It will be appreciated that an arrangement such as that just described or such as that illustrated in FIGURE 4 may also be employed with advantage to measure coating thicknesses. Coating thicknesses may be measured in a number of different ways with such a proximity probe 10 and associated circuitry. For example, the coating thickness may be measured by bringing the probe into direct contact with the coating and sensing the distance to the electrically conductive base material, or by bringing the sensing probe to a known distance from the coating and sensing the distance to the base material, in either of which cases, the coating material may be non-conductive or may be electrically conductive so long as the coating and conductive base material differ in content so that a frequency can be selected which will allow the sensing element output to pierce the coating. Also, where the materials are of such a nature that the sensing probe output is not sensitive merely to the location of the adjacent surface of the base material, measurement of the coating thickness may be made by measuring the thickness of the entire base and coating sandwich prior to and after application of the coating, or, where the coating and/or base material is non-conductive, measurement may be effected by sensing the displacement of a loaded roller made of electrically conductive material when the material of interest is passed between the loaded roller and another fixed roller.

FIGURE 5 illustrates a circuit which is generally similar to FIGURE 4 but which includes a meter such as an A.C. millivolt meter 60 connected across the two leads extending between the opposite ends of the transformer secondary 42 and the ring demodulator 43, for the purpose of providing A.C. voltage metered information as well as direct current metered information from the demodulator, which metered information upon testing of unknown materials of known thickness or proximity to the probe can be compared with meter information obtained from reference materials to permit identification of unknown materials passed in proximity to the probe.

Figure 6:
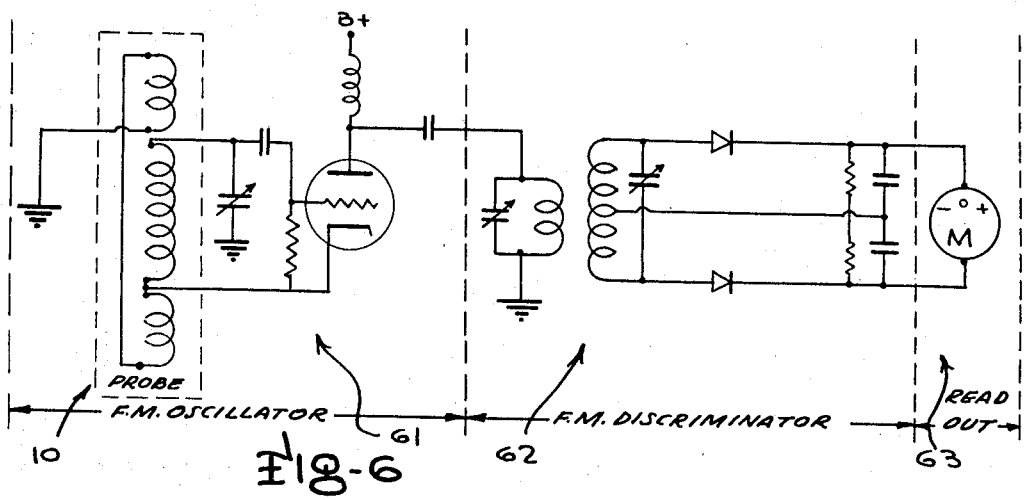
FIGURE 6 is a schematic diagram illustrating circuitry which may be employed with the probe to provide digital readout of output signals from the probe.

The probe of the previously described construction also provides a means which may be incorporated into a frequency modulated oscillator circuit to provide frequency modulation of the oscillator output in accordance with variations in the proximity of a metallic conductor relative to the probe. Such an arrangement is schematically illustrated in FIGURE 6, wherein the probe 10 is connected to a frequency modulation oscillator generally indicated at 61, the output of which is applied to a typical frequency modulation discriminator 62 to provide a readout on some appropriate readout device 63. Such an arrangement provides the advantages of digital readout of the sensing element signal output for use in computer functions and digital control systems, as well as reduced signal distortion due to extraneous outside interference or self noise. Such an arrangement may conveniently be used in a microphone and sound transducer system as indicated in block diagram form in FIGURE 7, wherein the probe 10 connected with a frequency modulation oscillator 61 and frequency modulation discriminator 62 of the type shown in FIGURE 6 is interposed in a microphone 64 having a thin metallic diaphragm 65 of an electrically conductive material adjacent but spaced out of contact with the sensing end of the probe 10. The signal variations occurring across the readout device 63 are applied to drive a suitable sound transducer 66, or the discriminator output may be applied to drive the transducer 66 without employing the readout device 63, to effect reproduction of the sound denoting pressure variations which produce alteration of the spacing between the diaphragm 65 and probe 10 and thereby effect frequency modulation of the oscillator output which is discriminated and employed to drive the transducer.

Figure 7:
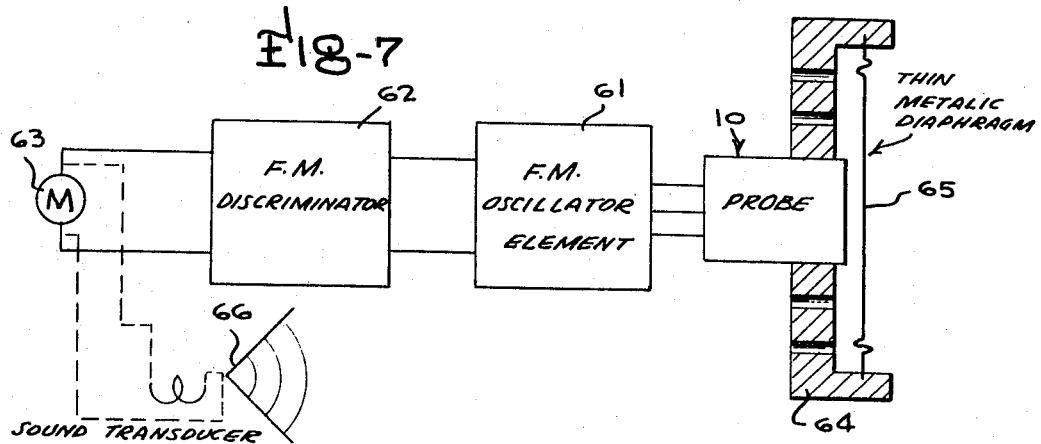
FIGURE 7 is a block diagram of a microphone and transducer circuit illustrating another application of the present invention.

Rather than incorporating the sensing probe in a microphone as illustrated in FIGURE 7, a unitary probe and pressure responsive diaphragm assembly can be conveniently provided by merely extending the non-magnetic shell 22 at the open or sensing end of the probe somewhat beyond the adjacent end of the internal core 17 and mounting in the extended portion of the shell a metallic diaphragm whose periphery is fixed in the shell. Pressure induced vibration of the diaphragm will then vary its spacing from the adjacent end of the internal core and thereby vary the output signal produced across the windings 11, 12.

While several preferred examples of the present invention have been particularly shown and described, it is apparent that various modifications may be made therein within the spirit and scope of the invention, and it is desired, therefore that only such limitations be placed on the invention as are imposed by the prior art and set forth in the appended claims.

I claim:

1. An electromagnetic sensing probe for non-contacting gaging of the distance between the probe and the proximate surface of an electrically conductive target material, said probe comprising a magnetic core member having an axially elongated leg, a series of three separate plural turn windings arranged in axially spaced serial relation on said core member leg providing a center winding and a pair of end windings flanking the center winding, said center winding forming a first coil means, said end windings being connected in series opposing relation and forming a second coil means, input connections for one of said coil means adapted to apply an alternating current electrical signal of selected frequency thereto, output connections for the other of said coil means for application to external apparatus of voltage conditions across said other coil means responsive to the electrical signal applied to said one coil means related to the distance between said target material and one extremity of said core member leg, said coil means and core member being formed to produce a projected field effect causing the voltage conditions at said output connections to have a balanced null value when the proximate target surface occupies a selected distance spaced from said one extremity of said core member leg and causing the voltage level to increase progressively as the distance from said extremity to said proximate target surface increases or decreases from said selected distance and undergo an approximate 180° phase shift at said selected distance, said core member also including an outer cup-shaped core portion of magnetic material having an annular cylindrical outer wall concentrically surrounding and radially spaced from said leg and the windings thereon in axially coextensive relation thereto and a disk-like end wall integral with said cylindrical outer wall, perpendicular to the axis of said leg extending between said leg and outer wall and closing the space therebetween at a point remote from said extremity, and a non-magnetic shield of generally cup-shaped configuration concentric with the leg axis and enclosing the outer wall and end wall of said core member having a circular opening at one end thereof adjacent and substantially concentric to said core member leg, said outer cup-shaped core portion being configurated to produce a concentrated field adjacent the end of said probe opposite said end wall shaped to provide a linear change in output voltage at said output connections with change in distance of said target surface from said selected distance.

2. In an electromagnetic sensing probe, the combination defined in claim 1 wherein said core member leg and outer wall are of elongated cylindrical configuration, said probe including an integral non-magnetic coil form on said core leg having an annular body portion immediately adjacent said leg axially coextensive with the space between said leg and outer wall and a plurality of axially spaced radially projecting flanges defining separate annular spaces therebetween receiving each of said center winding and end windings therein and conforming substantially to the configurations of the windings received therein.

3. An electromagnetic sensing probe for non-contacting gaging of the distance between the probe and the proximate surface of any electrically conductive target material, said probe comprising a core member having an axially elongated leg, an exciter coil and a pair of secondary coils each having plural turn windings arranged in axially spaced serial relation on said core member leg with said exciter winding located between said secondary coils, said secondary coils being of equal turns connected in series and opposite phase, input connections for said exciter coil adapted to apply an alternating current electrical signal of selected frequency thereto, output connections to said pair of secondary coils for sensing the voltage conditions across said secondary coils responsive to the electrical signal applied to said exciter coil, said coils and core member being formed to produce a projected field effect responsive to the signal applied to said exciter coil and affected by the proximity of the target material to an extremity of said core leg producing an output signal across said secondary coils which has a null value when the proximate target surface is located a selected distance away from the core leg extremity and which output signal increases in amplitude with variation of the proximate target surface distance from said extremity in directions both toward and away from the extremity relative to said selected distance, said output signal having a first phase for variations in one of said directions and an opposite phase for variation in the other of said directions, said core member including an outer cup-shaped core portion of magnetic material having an annular cylindrical outer wall concentrically surrounding and radially spaced from said leg and the coils thereon in axially coextensive relation thereto and a disk-like end wall integral with said cylindrical outer wall, perpendicular to the axis of said leg extending between said leg and outer wall and closing the space therebetween at a point remote from said extremity, and a non-magnetic shield of generally cup-shaped configuration concentric with the leg axis and enclosing the outer wall and end wall of said core member having a circular opening at one end thereof adjacent and substantially concentric to said core member leg, said outer core portion being configurated and positioned relative to said leg to produce a concentrated field adjacent the end of said probe opposite said end wall shaped to provide a linear change in the voltage conditions across said secondary coils with change in distance of said target surface from said selected distance.

4. In an electromagnetic sensing probe, the combination defined in claim 3 wherein said core member leg and outer wall are of elongated cylindrical configuration, said probe including an integral non-magnetic coil form on said core leg having an annular body portion immediately adjacent said leg axially coextensive with the space between said leg and outer wall and a plurality of axially spaced radially projecting flanges defining separate annular spaces therebetween receiving each of said center winding and end windings therein and conforming substantially to the configurations of the windings received therein.

5. In an electromagnetic sensing probe as defined in claim 4, all the remaining spaces within said shield being occupied by an iron filled hardenable cement material.

6. In a metal target monitoring system an electromagnetic sensing probe as defined in claim 3, adjustable means for balancing the resistive and capacitive reactance of said secondary coils, means for generating an alternating current electrical signal of selected frequency and applying the same to said input connections for said exciter coil, a ring demodulator having a plurality of unidirectionally conducting diodes therein, means for coupling a representation of the output signals from said output connections and a representation of the alternating current electrical signal applied to said input connections to said ring demodulator for demodulation and phase and amplitude comparison thereof, and read-out means intercoupled with said ring demodulator for producing an output indication of the amplitude of said output signal and its phase relative to the phase of said alternating current electrical signal.

7. In a metal target monitoring system, the combination defined in claim 6 including means for indicating properties of the output signals at said output connections for metal target materials of selected proximity to said core leg extremity providing information for identification of the metal being sensed.

8. In a metal target monitoring system, an electromagnetic sensing probe as defined in claim 3, carriage means movably supporting said probe in spaced relation to the proximate surface of the target material, servo-motor means for positioning said carriage means and probe relative to the target material, servo-amplifier means responsive to said voltage conditions at said output connections of said probe for activating said servo-motor to continuously position said carriage and probe relative to the proximate target surface to substantially maintain a distance therebetween producing said minimal voltage level at said output connections, and means for indicating variations in the position of said carriage and probe relative to a selected reference position.

References Cited
UNITED STATES PATENTS

| | | | |
|---|---|---|---|
| 2,915,699 | 12/1959 | Mierendorf et al. | 324—41 |
| 3,024,354 | 3/1962 | Mierendorf et al. | 219—131 |
| 3,147,574 | 9/1964 | La Pointe et al. | 324—24 |
| 3,249,869 | 5/1966 | Meyer et al. | 324—40 |

FOREIGN PATENTS 565,561 11/1944 Great Britain.

RUDOLPH V. ROLINEC, *Primary Examiner.*

R. J. CORCORAN, *Assistant Examiner.*